Feb. 28, 1956 C. W. LINCOLN 2,736,208

FOLLOW-UP MECHANISM

Filed April 29, 1953 2 Sheets-Sheet 1

INVENTOR
Clovis W. Lincoln
BY
Carl F. Sibbe

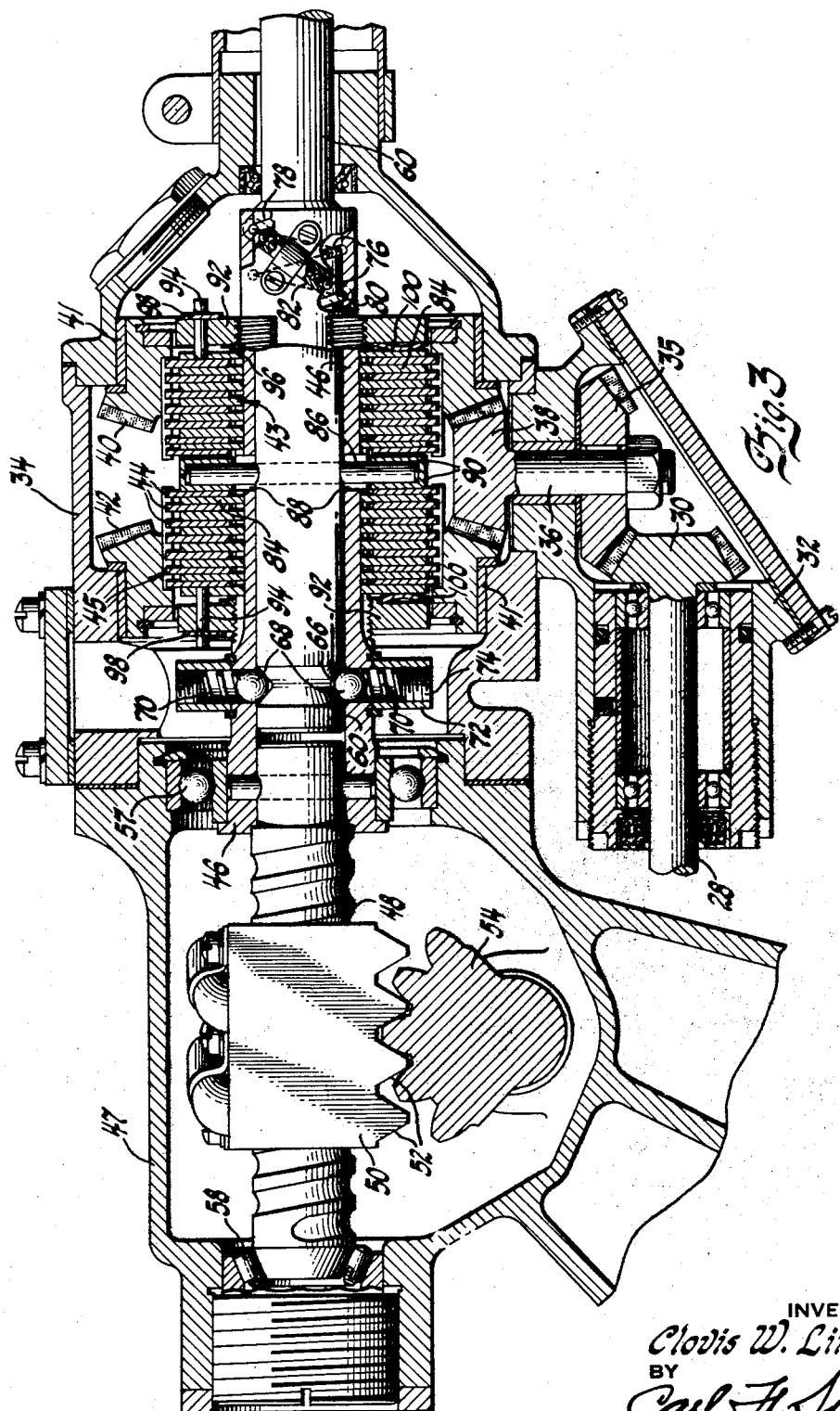

2,736,208

FOLLOW-UP MECHANISM

Clovis W. Lincoln, Saginaw, Mich., assignor to General Motors Corporation, Detroit, Mich., a corporation of Delaware Application April 29, 1953, Serial No. 351,900

14 Claims. (Cl. 74—388)

This invention concerns a mechanical follow-up mechanism of novel construction and operation. While the mechanism possesses other utility, it is considered especially valuable as applied to the power steering of a motor vehicle and it consequently will be particularly described in that connection.

The power steering of trucks, buses, and heavy off-the-road vehicles has been practiced for some time; indeed in many cases, due to high front end loadings, oversize tires, etc., it is almost essential that the vehicle be so steered, the force required to turn the dirigible wheels, at least when the vehicle is stationary or traveling at low speed, exceeding the strength of many individuals. Recently, power steering has been adopted for use in passenger cars and the innovation has been met with widespread acceptance, not only because it reduces steering effect, but because in most cases it provides a safety factor, substantially eliminating steering wheel fight or loss of wheel control from tire blow-outs, road bumps and ruts, etc.

In the instance of the smaller cars, particularly, the additional cost of the auxiliary apparatus, especially when taken in relation to the over-all cost of the car, has been considered objectionable in many quarters. This objection stems from the fact that the apparatuses presently available are hydraulically operated. Thus, each necessarily includes four fundamental and fairly expensive components: namely, a reservoir for the fluid medium, a pump drawing from the reservoir, a power cylinder operatively linked to the steering elements, and a valve controlling the flow between the pump and power cylinder. In addition, various fixtures and auxiliary valves are required, not to mention the necessary high pressure connecting lines. The specified major parts, and especially the pump and valve, must be manufactured to very close tolerances for successful operation, and this, of course, contributes to the cost of the apparatus.

My invention aims to provide a purely mechanical assemblage which satisfactorily performs the function of the previously proposed hydraulic gears.

Another object is to provide a mechanical gear which is positive in operation, comprises a minimum number of inexpensive parts and is readily assembled and installed.

Another and more specific object is to supply a mechanical gear, which is characterized in operation in that the power exerted at the rim of the steering wheel is proportional to the road resistance encountered.

Another specific object is to provide a mechanical gear of the type and for the purpose indicated having operating characteristics such that the driver of the vehicle retains a "steering feel."

Still another specific object is to supply a mechanical unit which allows for ordinary manual steering of the vehicle on failure of the source of power.

Additional objects and features of the invention will appear from the following specific description which will proceed with reference to the accompanying drawings illustrating a preferred embodiment of the invention and in which:

Figure 3 is a longitudinal section through the assemblage, taken generally on the line 3—3 of Figure 2, the gearing through which the assemblage is powered being shown 90° out of position.

Figure 1:
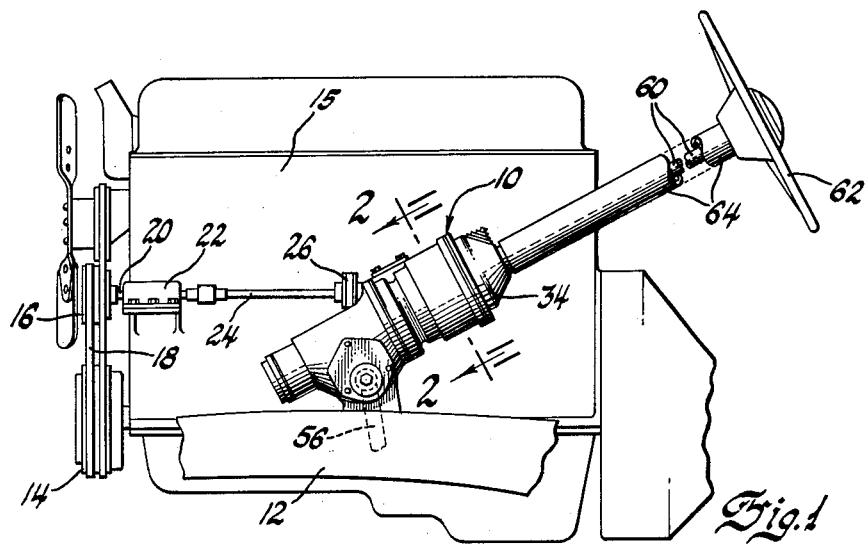
Figure 1 shows the assemblage in association with the power plant and steering gear of an automotive vehicle.
Figure 2:
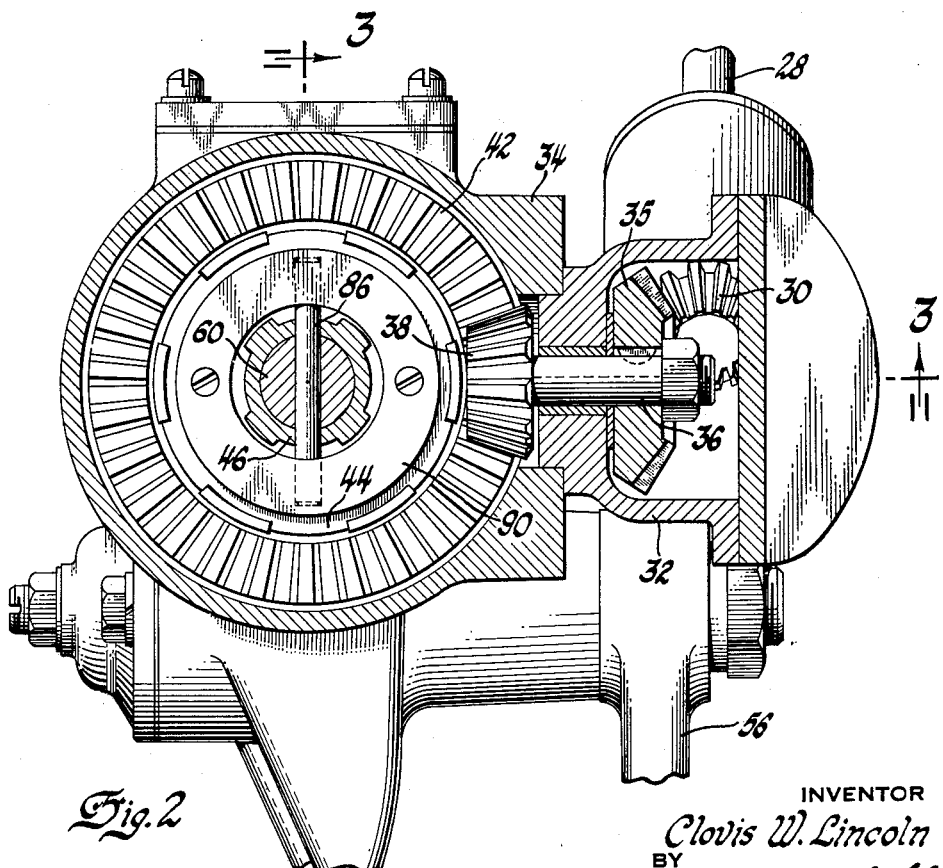
Figure 2 is a section on the line 2—2 of Figure 1.

Referring first to Figure 1, it will be observed that the power steering assemblage 10 is supported with the steering gear from the frame 12 of the vehicle and that it is powered from the crankshaft of the motor 15 by means of pulleys 14 and 16 inter-connected via a belt 18. Pulley 16 is fast on shaft section 20 which extends through a bracket mounting 22 and connects with a shaft section 24 terminating in a free wheel device 26 of conventional construction. Shaft section 28 (Fig. 2) from the opposite side of the free wheel device carries a helical pinion 30 surrounded by an auxiliary casing or gear box joined to the casing 34. Both casings should be filled with oil to the extent necessary to provide adequate lubrication and heat transfer.

Pinion 30 mates with a bevel gear 35 fixed on a shaft 36 carrying at its opposite end a smaller bevel gear 38 disposed within the casing 34. Bevel gear 38 meshes with a pair of ring gears 40—42 turning in bushings 41; gear 40 being rotated in a counterclockwise direction, gear 42 in a clockwise direction. The ring gears are in constant rotation so long as the engine of the vehicle is running.

Splined to the ring-gears for rotation therewith are the driving discs 44 of a pair of multi-disc friction clutches 43, 45. Discs 44 normally rotate freely about a sleeve member 46 terminating within a gear box 47 integral with the casing 34. Such sleeve has splined thereto the driven discs 84 of the clutch units and carries fixed at its left hand end a worm 48 actuating a conventional ball nut 50 including integral teeth 52 through which the nut mates with the gear sector 54 of a Pitman arm 56 (Fig. 1). The worm 48 turns in bearings 58 at the lower or left hand end of the gear box, while the sleeve proper is supported for rotation in ball bearings 57.

Sleeve 46 receives the lower end of a stering shaft 60 mounting the usual steering wheel 62 and surrounded by the usual mast jacket 64 mediate the steering wheel and the casing 34. Shaft 60 is grooved at 66 to receive balls 68 maintained in position by pre-loaded springs 70 confined in a retaining ring 72 surrounding and carried by the sleeve 46. Threaded plugs 74 enable loading of the springs to the extent desired.

Shaft 60 is inter-connected with the sleeve 46 to the right of the friction clutch units (Fig. 3) through balls 76 which seat in matching helical grooves 78, 80, respectively, formed in the shaft and sleeve. The balls completely fill both the spiral passage formed by the matching helical grooves and the recirculator 82 by means of which the balls are transferred between the ends of the spiral passage.

Between the clutch units, 43, 45, shaft 60 has fixed therein a pin 86, which passes through apertures 88 in the sleeve 46 and extends radially of the sleeve. A ring member 90 surrounding the sleeve is formed to receive the ends of the pin 86. This ring may bear very lightly against the innermost of the driving clutch discs 44.

The multi-disc clutches are adjusted by turning the plates 92 threaded on the sleeve 46. With the proper adjustment made, the plate is locked in place by a pin 94 which enters a hole in a lock plate 96 and is held in place by a small leaf spring 98. A leaf spring 100 mediate each adjustor plate and the corresponding lock plate 96 represents a safety device as will be hereinafter brought out.

Reverting now to the balls 68 and the spring 70 it will be observed that the springs exert an outward force, in one direction against the sleeve, retaining ring 72 being fixed to the sleeve, and in the other direction against the steering shaft 60. The purpose of this arrangement is to provide a yieldable resistance which must be overcome before the shaft 60 can be rotated relative to the sleeve 46 to the limited extent allowed by the ball-and-groove connection 76, 78, 80. In view of the helical nature of the latter connection, this limited relative rotation, occurring when the steering resistance exceeds the integrating effect of the spring-loaded balls 68, is accompanied by simultaneous axial movement of the shaft in one direction or the other, as determined by the direction of rotation of the shaft, with resultant engagement of one of the clutches.

The spring-loaded balls 68, by tending to maintain the shaft and sleeve in a neutral or centered relation, serve to provide a "steering feel" and prevent a "grabbing" sensation on clutch engagement. By turning the plugs 74 the balls may be pre-loaded to any desired extent. Normally the pre-loading is equivalent to from 2 to 8 pounds of manual steering effort at the rim of the steering wheel. With such a pre-loading the steering required to keep the vehicle on a straight course may be entirely manual.

Having regard to the operation of the described gear, let it be assumed that the vehicle is in motion with the motor running and the steering wheel is rotated clockwise to make a right turn. The resistance to steering effort being such as to preclude turning of the sleeve and worm by the steering shaft through the spring-loaded balls 68, the sleeve and worm remain stationary, or essentially so, with the result that the steering shaft moves axially downwardly to bring about engagement of the driving and driven discs of the lower clutch unit 45 through the pin 86 and the ring 90.

Assuming a left turn, the steering shaft, on rotation thereof relative to the sleeve, moves axially upwardly rather than downwardly, so that the driving and driven discs of the upper clutch unit 43 become engaged and the shaft is powered to the left. In any case, steering control is had through the steering wheel at all times since on release of the manual effort at the steering wheel, the shaft and sleeve are substantially instantaneously restored to their normal centered relation by the spring loaded balls 68, this action necessarily proceeding with disengagement of the clutch components. The geometry of the steering linkage is nowise affected by the described gear; hence, the normal tendency of the dirigible wheels to assume a straight ahead position is retained. Leaf springs 100 between the clutch adjusting plates and the lock plates 96 function to prevent over-loading of the clutches when the dirigible wheels have reached their stops or when the steering resistance is extreme.

I claim:

1. A follow-up mechanism comprising a working member supported for rotary movement and having associated therewith a pair of oppositely disposed clutch units, the driving components of said units being rotatable relative to said member, the driven components thereof being incapable of such relative rotation, transmission means through which the opposed driving components may be constantly rotated in opposite directions in the operation of the mechanism, a control member supported for rotary movement with said working member and for limited axial movement, said control member having a lost motion connection with said working member permitting limited rotary movement thereof relative to said working member, yieldable centering means associated with said members serving to prevent rotary movement of said control member relative to said working member in the absence of a predetermined load on said working member, means interconnecting said members for inducing relative axial movement of said control member on rotation of the same relative to said working member, and means operably associated with said control member responsive on said relative axial movement to cause engagement of one of said clutches.

2. A mechanism as defined by claim 1 in which friction clutches are utilized.

3. A follow-up mechanism comprising a working member supported for rotary movement and mounting a pair of oppositely disposed multi-disc friction clutch units, the driving discs of said units being rotatable relative to said member, the driven discs thereof being incapable of such relative rotation, transmission means through which the two sets of driving discs may be constantly rotated in opposite directions, a control member supported for rotary movement with said working member and for limited axial movement, said control member having a lost motion connection with said working member permitting limited rotary movement thereof relative to said working member, yieldable centering means associated with said members serving to prevent rotary movement of said control member relative to said working member in the absence of a predetermined load on said working member, means inter-connecting said members for inducing relative axial movement of said control member on rotation of the same relative to said working member, and means operably associated with said control member mediate said clutch units adapted to cause engagement of one of said units on said relative axial movement, said means for inducing the said relative axial movement being spaced from said last-mentioned means by one of said clutch units.

4. A follow-up mechanism comprising a working member supported for rotary movement and having associated therewith a pair of oppositely disposed clutch units, the driving components of said units being rotatable relative to said member, the driven components thereof being incapable of such relative rotation, transmission means through which the opposed driving components may be constantly rotated in opposite directions in the operation of the mechanism, a control member supported for rotary movement with said working member and for limited axial movement, said control member having a lost motion connection with said working member permitting limited rotary movement thereof relative to said working member, yieldable centering means associated with said members serving to prevent rotary movement of said control member relative to said working member in the absence of a predetermined load on said working member, a ball-in-groove connection between said members for inducing relative axial movement of said control member on rotation of the same relative to said working member and means operably associated with said control member responsive to said relative axial movement to cause engagement of one of said clutch units.

5. A follow-up mechanism comprising a working member supported for rotary movement and mounting a pair of oppositely disposed multi-plate friction clutch units, the driving discs of said units being rotatable relative to said member, the driven discs thereof being incapable of such relative rotation, transmission means whereby the two sets of driving discs may be constantly rotated in opposite directions, a control member supported for rotary movement with said working member and for limited axial movement, said control member having a lost motion connection with said working member permitting limited rotary movement thereof relative to said working member, yieldable centering means associated with said members serving to prevent rotary movement of said control member relative to said working member in the absence of a predetermined load on said working member, a ball-in-groove connection between said members for inducing relative axial movement of said control member on rotation of the same relative to said working member, and means associated with said control member mediate said clutch units operating to cause engagement of one of said units on such relative axial movement, said ballin-groove connection being spaced from said last-mentioned means by one of said clutch units.

6. An assemblage for the power steering of a motor vehicle comprising a rotatable worm-bearing shaft operatively connectable to the steering elements of the vehicle and having associated therewith a pair of oppositely disposed clutch units, the driving components of said units being rotatable relative to said shaft, the driven components thereof being incapable of such relative rotation, power transmission means whereby the opposed driving components may be continuously rotated in opposite directions through a take-off from the motor of the vehicle, a steering shaft supported for rotary movement with said worm-bearing shaft and for limited axial movement, said steering shaft having a lost motion connection with said worm-bearing shaft permitting limited rotary movement thereof relative to said worm-bearing shaft, yieldable centering means associated with said shafts serving to prevent rotary movement of said steering shaft relative to said worm-bearing shaft in the absence of a predetermined steering resistance, means inter-connecting said shafts for inducing relative axial movement of said steering shaft on rotation of the same relative to said worm-bearing shaft, and means associated with said steering shaft operating to cause engagement of one of said clutch units on said relative axial movement.

7. An assemblage as defined by claim 6 in which friction clutches are utilized.

8. An assemblage for the power steering of a motor vehicle comprising a rotatable worm-bearing shaft operatively connectable to the steering elements of the vehicle and mounting a pair of oppositely disposed multi-disc friction clutch units, the driving discs of said units being rotatable relative to said shaft and slidable thereon, the driven discs of said units being splined to said shaft, power transmission means whereby the opposed sets of driving discs may be continuously rotated in opposite directions through a take-off from the motor of the vehicle, a steering shaft supported for rotary movement with said worm-bearing shaft and for limited axial movement, said steering shaft having a lost motion connection with said worm-bearing shaft permitting limited rotary movement thereof relative to said worm-bearing shaft, yieldable centering means associated with said shafts serving to prevent rotary movement of said steering shaft relative to said worm-bearing shaft in the absence of a predetermined steering resistance, means inter-connecting said shafts for inducing relative axial movement of said steering shaft on rotation of the same relative to said worm-bearing shaft, and means associated with said steering shaft mediate said clutch units operating to cause engagement of one of said clutch units on said relative axial movement, said means for inducing the said relative axial movement being spaced from said last-mentioned means by one of said clutch units.

9. An assemblage for the power steering of a motor vehicle comprising a rotatable worm-bearing shaft operatively connectable to the steering elements of the vehicle and having associated therewith a pair of oppositely disposed clutch units, the driving components of said units being rotatable relative to said shaft, the driven components thereof being incapable of such relative rotation, power transmission means whereby the opposed driving components may be continuously rotated in opposite directions through a take-off from the motor of the vehicle, a steering shaft supported for rotary movement with said worm-bearing shaft and for limited axial movement, said steering shaft having a lost motion connection with said worm-bearing shaft permitting limited rotary movement thereof relative to said worm-bearing shaft, yieldable centering means associated with said shafts serving to prevent rotary movement of said steering shaft relative to said worm-bearing shaft in the absence of a predetermined steering resistance, a ball-in-groove connection between said shafts for inducing relative axial movement of said steering shaft on rotation of the same relative to said worm-bearing shaft, and means associated with said steering shaft operating to cause engagement of one of said clutch units on said relative axial movement.

10. An assemblage for the power steering of a motor vehicle comprising a rotatable worm-bearing shaft operatively connectable to the steering elements of the vehicle and mounting a pair of oppositely disposed multi-disc friction clutch units, the driving discs of said units being rotatable relative to said shaft and slidable thereon, the driven discs being splined to said shaft, power transmission means whereby the opposed sets of driving discs may be continuously rotated in opposite directions through a take-off from the motor of the vehicle, a steering shaft supported for rotary movement with said worm-bearing shaft and for limited axial movement, said steering shaft having a lost motion connection with said worm-bearing shaft permitting limited rotary movement thereof relative to said worm-bearing shaft, yieldable centering means associated with said shafts serving to prevent rotary movement of said steering shaft relative to said worm-bearing shaft in the absence of a predetermined steering resistance, a ball-in-groove connection for inducing relative axial movement of said steering shaft on rotation of the same relative to the worm-bearing shaft, and means mediate said clutch units operating to cause engagement of one of said clutch units on said relative axial movement, said ball-in-groove connection being spaced from said last-mentioned means by one of said clutch units.

11. An assemblage for the power steering of a motor vehicle comprising a rotatable worm-bearing sleeve operatively connectable to the steering elements of the vehicle and directly mounting a pair of spaced multi-disc clutch units, the driving discs of said units being rotatable relative to said sleeve and slidable thereon, the driven discs being splined to said sleeve, power transmission means whereby the two sets of driving discs may be continuously rotated in opposite directions through a take-off from the motor of the vehicle, a steering shaft co-axial with said sleeve and terminating therewithin, said shaft being supported for rotary movement with said sleeve and for simultaneous rotary and axial movement relative to said sleeve, yieldable centering means associated with said sleeve and said shaft and operating to prevent rotary movement of said shaft relative to said sleeve in the absence of a predetermined steering resistance, means interconnecting said sleeve and said shaft for inducing relative axial movement of said shaft on rotation of the same relative to said sleeve and means connected to said shaft operating to cause engagement of one of said clutch units on said relative axial movement.

12. An assemblage for the power steering of a motor vehicle comprising a rotatable worm-bearing sleeve operatively connectable to the steering elements of the vehicle and directly mounting a pair of spaced multi-disc clutch units, the driving discs of said units being rotatable relative to said sleeve and slidable thereon, the driven discs being splined to said sleeve, power transmission means whereby the two sets of driving discs may be continuously rotated in opposite directions through a take-off from the motor of the vehicle, a steering shaft co-axial with said sleeve and terminating therewithin, said shaft being supported for rotary movement with said sleeve and for simultaneous rotary and axial movement relative thereto, spring means associated with said sleeve and said shaft tending to prevent rotary movement of said shaft relative to said sleeve in the absence of a predetermined steering resistance, a ball-in-groove connection between said shaft and said sleeve for inducing relative axial movement of said shaft on rotation of the same relative to said sleeve and means fixed to said shaft operating to cause engagement of one of said clutch units on said relative axial movement.

13. An assemblage for the power steering of a motor vehicle comprising a rotatable worm-bearing sleeve operatively connectable to the steering elements of the vehicle and directly mounting a pair of spaced multi-disc clutch units, the driving discs of said units being rotatable relative to said sleeve, the driven discs being splined to said sleeve, power transmission means whereby the two sets of driving discs may be continuously rotated in opposite directions through a take-off from the motor of the vehicle, a steering shaft co-axial with said sleeve and terminating therewithin, said shaft being supported for rotary movement with said sleeve and for simultaneous rotary and axial movement relative thereto, spring means associated with said sleeve and said shaft tending to prevent rotary movement of said shaft relative to said sleeve in the absence of a predetermined steering resistance, a ball-in-groove connection between said shaft and said sleeve for inducing relative axial movement of said shaft on rotation of the said sleeve and means fixed in said shaft mediate said clutch units adapted to cause engagement of one of said units on said relative axial movement, said ball-in-groove connection being spaced from said last-mentioned means by one of said clutch units.

14. An assemblage for the power steering of a motor vehicle comprising a rotatable worm-bearing sleeve operatively connectable to the steering elements of the vehicle and directly mounting a pair of spaced multi-disc clutch units, the driving discs of said units being rotatable relative to said sleeve and slidable thereon, the driven discs being splined to said sleeve, power transmission means whereby the two sets of driving discs may be continuously rotated in opposite directions through a takeoff from the motor of the vehicle, a steering shaft co-axial with said sleeve and terminating therewithin, said shaft being supported for rotary movement with said sleeve and for simultaneous rotary and axial movement relative thereto, spring-loaded ball centering means associated with said shaft and said sleeve tending to prevent rotary movement of said shaft relative to said sleeve in the absence of a predetermined steering resistance, a ball-in-groove connection between said shaft and said sleeve for inducing relative axial movement of said shaft on rotation of the same relative to said sleeve and pin means extending radially of said shaft and through apertures in said sleeve for causing engagement of one of said clutch units on said relative axial movement, said pin means standing in mediate relation to said clutch units, said ball-in-groove connection being spaced from said pin means by one of said clutch units and from said spring-loaded ball centering means by both of said units.

References Cited in the file of this patent
UNITED STATES PATENTS

| | | |
|---|---|---|
| 803,565 | Dina | Nov. 7, 1905 |
| 2,311,010 | Vickers | Feb. 16, 1943 |